Feb. 5, 1957 R. M. SANDERS 2,780,376
MACHINE FOR CONTINUOUSLY LAYING AND JOINING PIPE SECTIONS
Filed March 1, 1955 8 Sheets-Sheet 2
Fig. 3
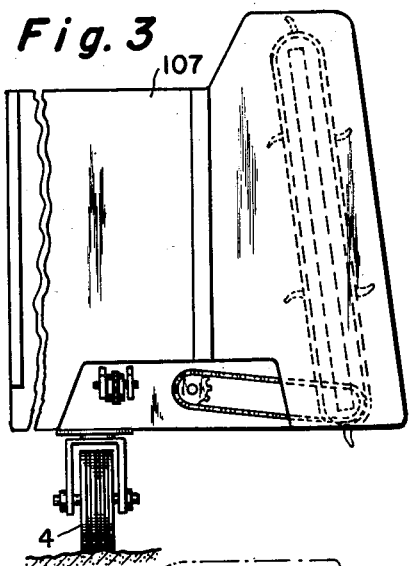
Fig. 4
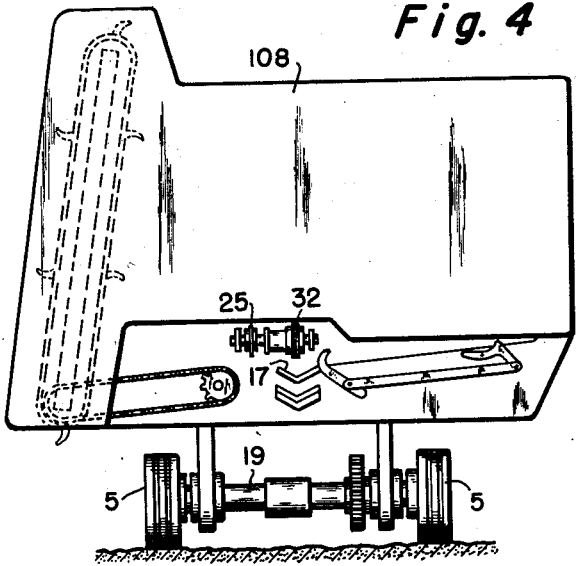
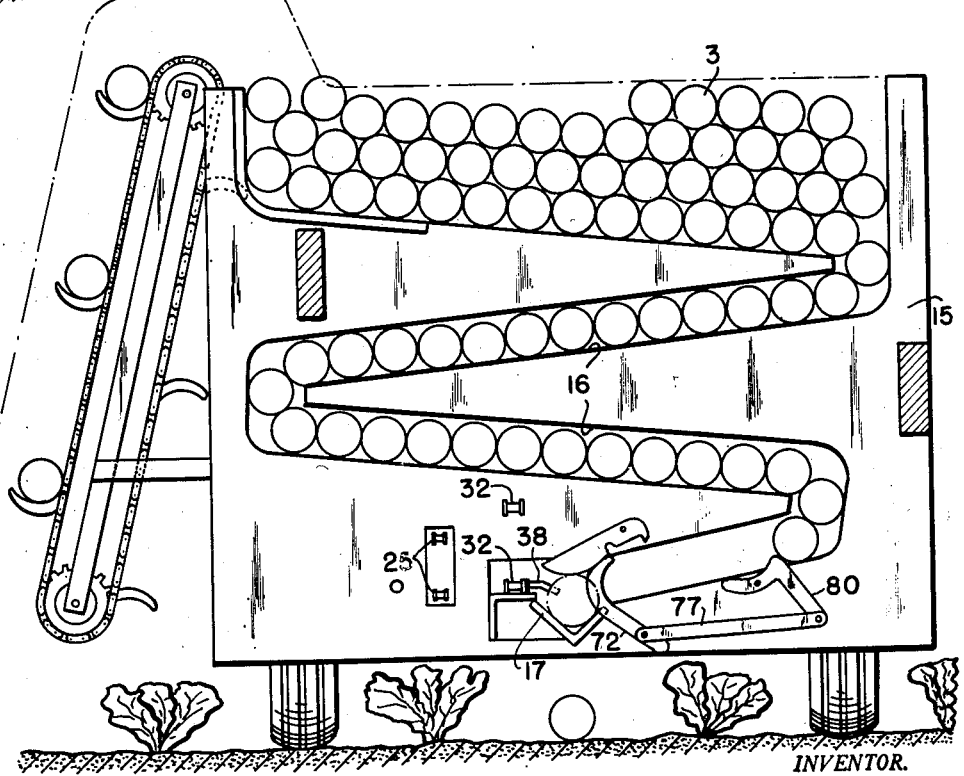
Fig. 5
INVENTOR.
Ralph M. Sanders
BY
HIS ATTORNEYS INVENTOR.
Ralph M. Sanders
BY
HIS ATTORNEYS Feb. 5, 1957 R. M. SANDERS 2,780,376
MACHINE FOR CONTINUOUSLY LAYING AND JOINING PIPE SECTIONS
Filed March 1, 1955 8 Sheets-Sheet 4
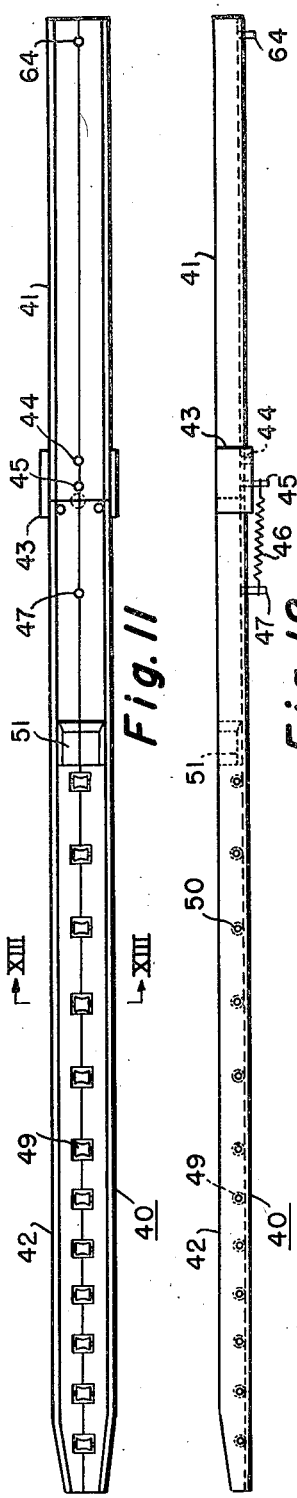
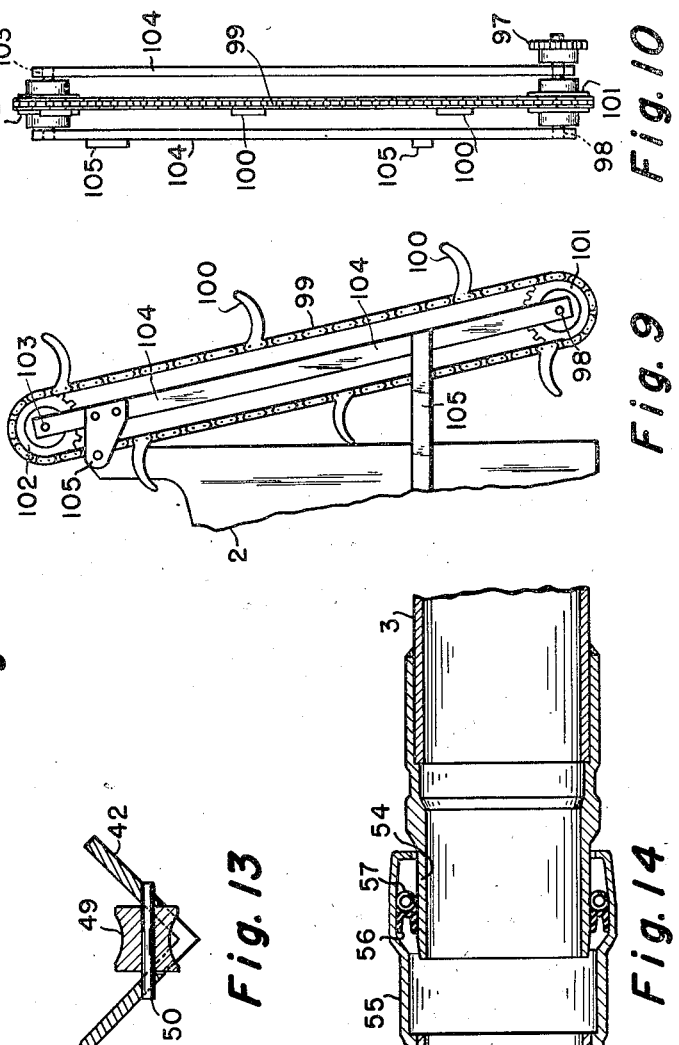
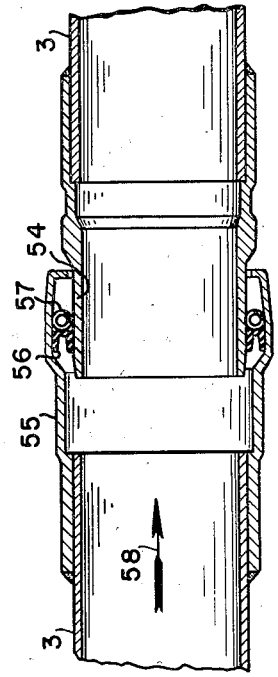
INVENTOR.
Ralph M. Sanders
BY
HIS ATTORNEYS INVENTOR.
Ralph M. Sanders
BY
HIS ATTORNEYS Feb. 5, 1957  R. M. SANDERS  2,780,376
MACHINE FOR CONTINUOUSLY LAYING AND JOINING PIPE SECTIONS
Filed March 1, 1955  8 Sheets-Sheet 6

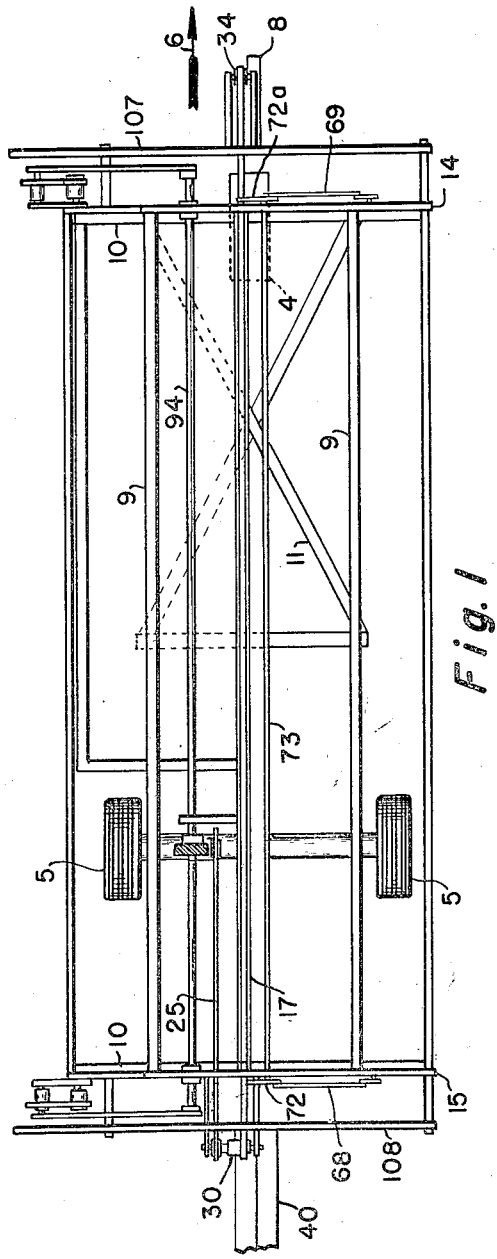
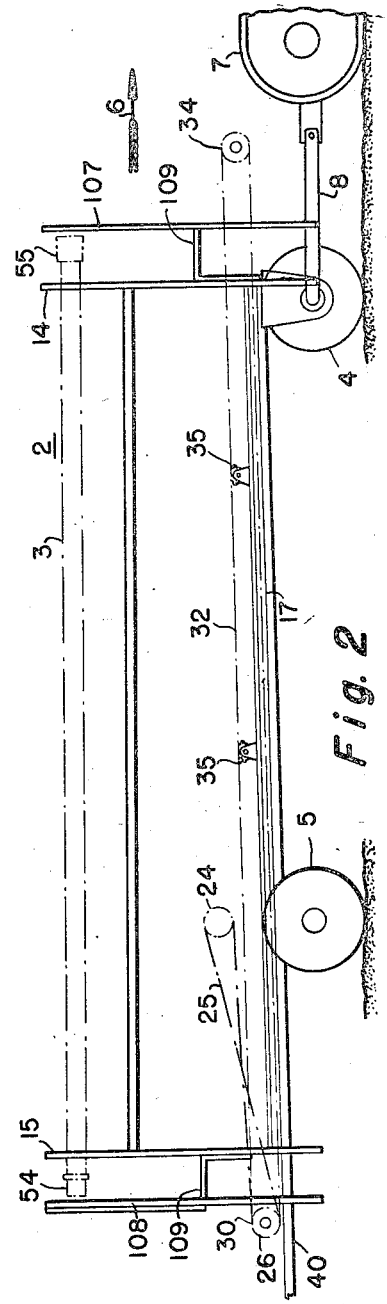

INVENTOR.
Ralph M. Sanders
BY
HIS ATTORNEYS

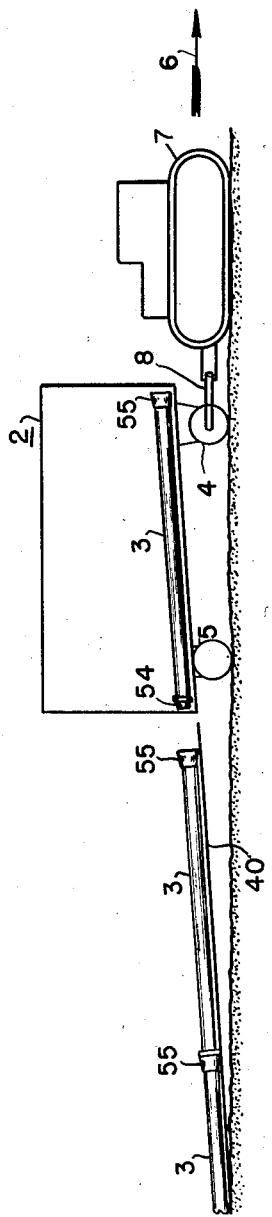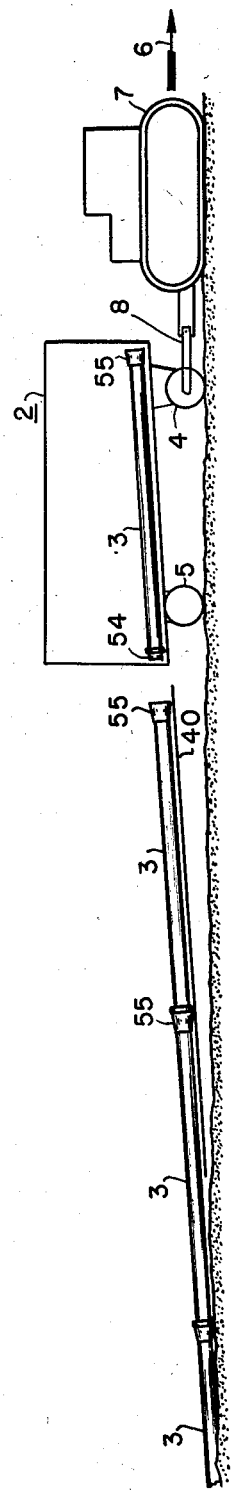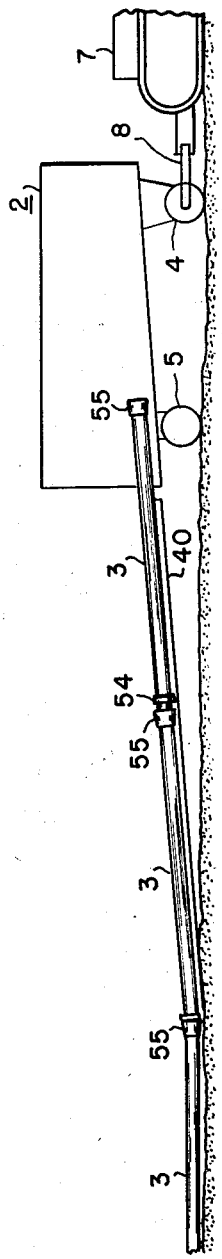

United States Patent Office 2,780,376
Patented Feb. 5, 1957

2,780,376

MACHINE FOR CONTINUOUSLY LAYING AND JOINING PIPE SECTIONS

Ralph M. Sanders, Pittsburgh, Pa.

Application March 1, 1955, Serial No. 491,496

10 Claims. (Cl. 214—519)

This invention relates to a machine for continuously laying and joining pipe sections. The device is particularly adapted for continuously laying and joining pipe sections to form a pipeline to be used for irrigation purposes but the pipeline may be used for other purposes. The pipe sections are of the type having a bell end and a spigot end, such pipe sections being capable of being joined by merely pushing the spigot end of a pipe section into the bell end of a preceding pipe section, thereby automatically coupling the pipe sections together without employing any other connecting means for joining the pipe sections.

In accordance with the present invention, the machine comprises a carriage and means such as a tractor for moving it along the ground. An upstanding rack is supported on the carriage adjacent each end thereof, each rack supporting the ends of pipe sections arranged longitudinally of the carriage. A cradle is supported on the carriage and extends longitudinally thereof. Means is provided for feeding the pipe sections one at a time from the racks onto the cradle. A ramp is connected at its front end to the rear of the carriage and the ramp slopes downwardly and rearwardly with its rear end dragging on or supported adjacent the ground. Means is provided for pushing the pipe sections one at a time from the cradle onto the ramp as the carriage moves forwardly. The pipe sections are pushed successively down the ramp in end to end relation to each other. In this manner, the spigot end of a pipe section is forced by the pushing means into the bell end of a preceding pipe section to automatically form a joint between adjacent pipe sections. The carriage moves forward continuously and the different pipe sections are pushed from the cradle intermittently, slide down the ramp and are joined together. The ramp, being connected at its front end to the rear of the carriage, moves forwardly along with the carriage and the joined pipe sections slide off of the rear end of the ramp onto the ground or into a ditch formed in the ground.

In the accompanying drawings which illustrate a preferred embodiment of my invention, Figure 1 is a plan view of the machine;

Figure 2 is a side elevation of the machine shown in Figure 1;

Figure 3 is a front elevation of the machine shown in Figure 1;

Figure 4 is a rear elevation of the machine shown in Figure 1;

Figure 5 is a rear elevation of the machine shown in Figure 1 with the rear guard plate removed, the figure also showing the pipe as laid between rows of plants;

Figure 9 is a side elevation of a loading conveyor and a portion of the carriage;

Figure 10 is a front elevation of the loading conveyor shown in Figure 9;

Figure 11 is a plan view and Figure 12 is a side elevation of the ramp down which the pipe sections slide from the carriage to the ground;

Figure 13 is a transverse section taken on the line XIII—XIII of Figure 11;

Figure 14 is a longitudinal section through the ends of adjacent pipe sections illustrating the means for coupling the pipe sections together;

Figure 23:
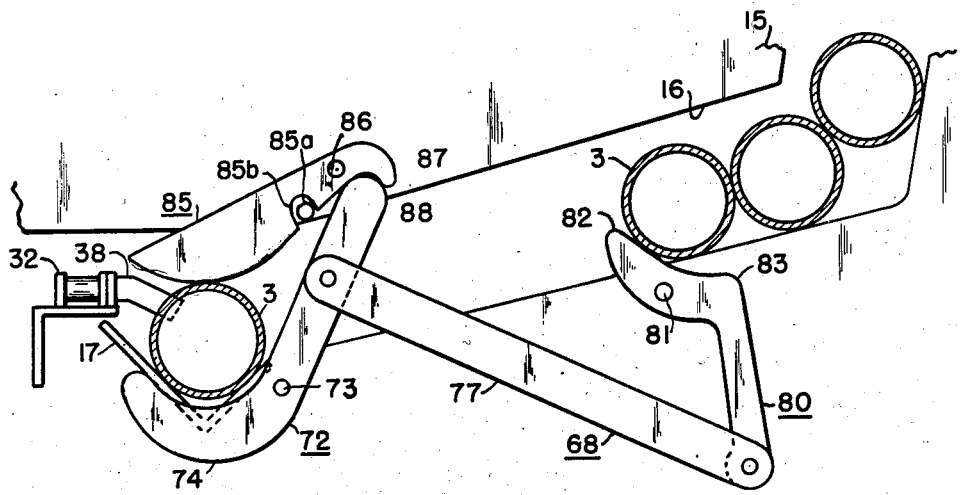
Figure 24:
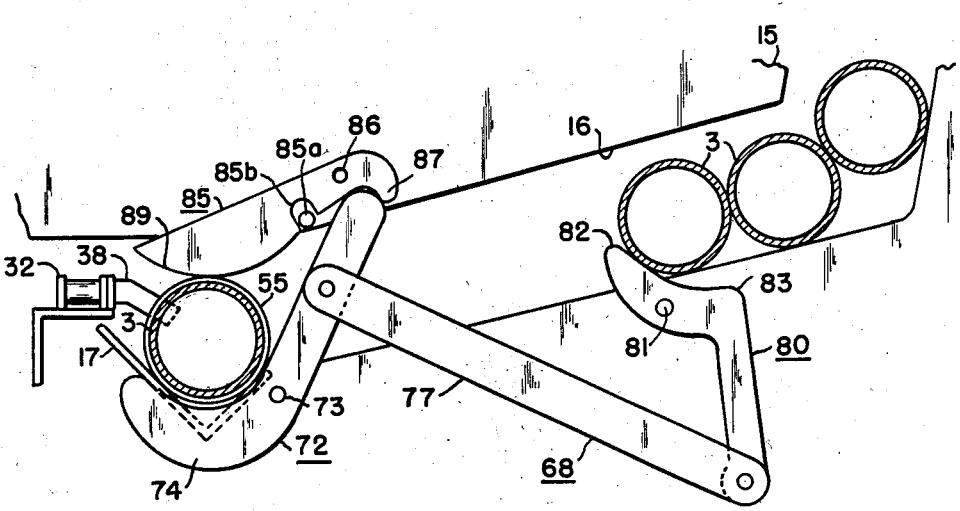

Figures 20-24 inclusive illustrate different positions of the means for feeding the pipe sections one at a time from the racks to the cradle, Figures 23 and 24 also showing one of the dogs for pushing a pipe section from the cradle onto the ramp; and Figures 25-27 inclusive illustrate successive steps in laying and joining pipe sections together.

Referring more particularly to the accompanying drawings, a carriage 2 which supports a plurality of pipe sections 3 has a front ground wheel 4 and two rear ground wheels 5. The carriage 2 is drawn in the direction indicated by the arrows 6 by a tractor 7 connected to the carriage in the usual manner by a drawbar 8. The carriage has a frame including longitudinal members 9, end transverse members 10 and cross bracing 11, the frame being supported from the wheels 4 and 5. The frame supports an upstanding front rack 14 and an upstanding rear rack 15. The rear rack is shown in greater detail in Figure 5. The ends of the pipe sections 3 are supported by the racks 14 and 15. A plurality of pipe sections are placed on the upper portions of the racks which are provided with downwardly sloping slots 16, the lower ends of the slots terminating adjacent a V-shaped cradle 17 which extends longitudinally of the carriage between the racks 14 and 15. The pipe sections are fed one at a time from the racks into the cradle 17 as described more particularly hereinafter.

Figure 6:
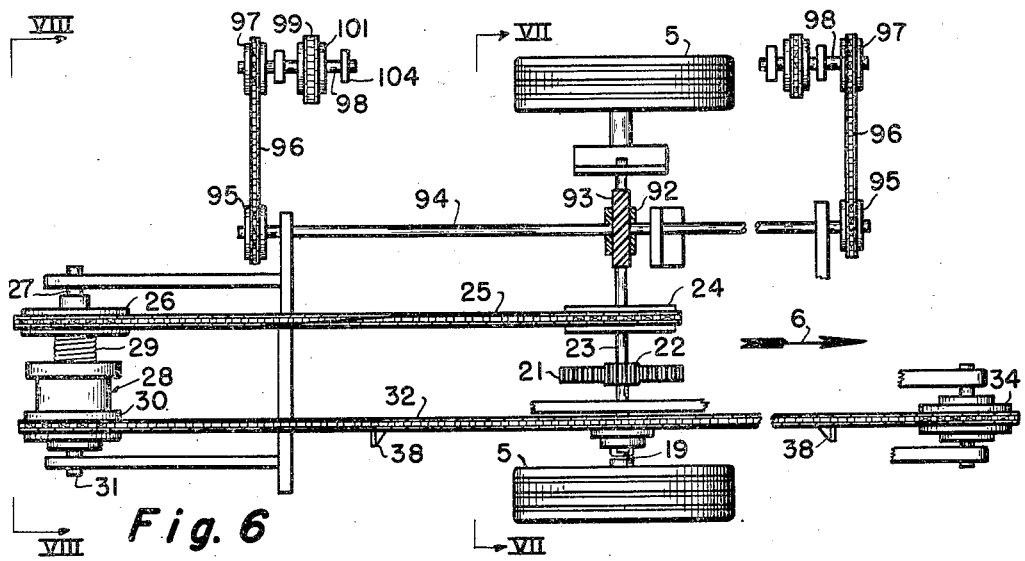
Figure 6 is a diagrammatic plan view illustrating the driving mechanism.
Figure 7:
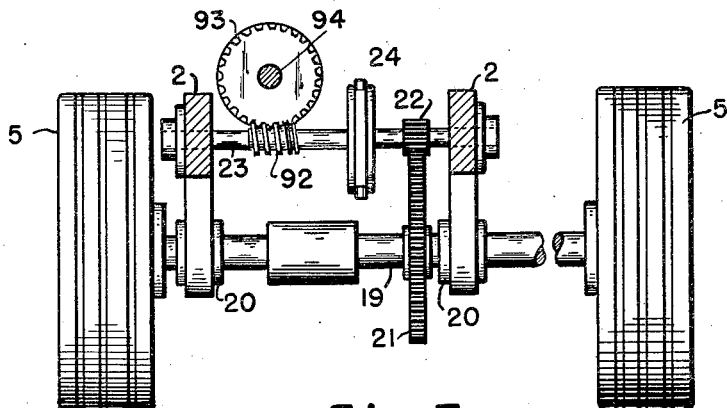
Figure 7 is a transverse vertical section taken on the line VII—VII of Figure 6.
Figure 8:
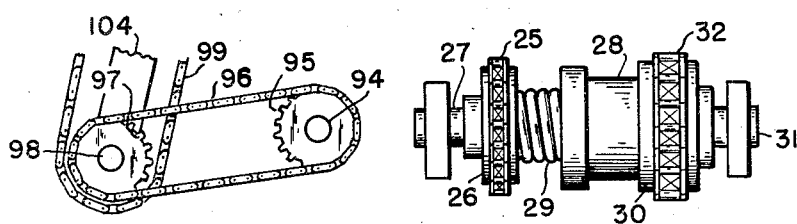
Figure 8 is a rear elevation taken on the line VIII—VIII of Figure 6.
Figure 15:
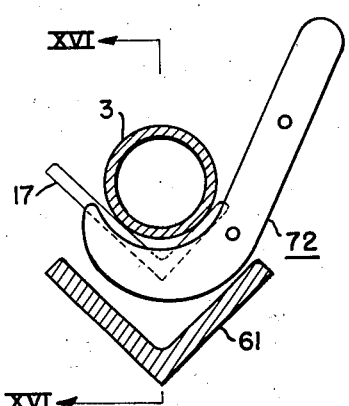
Figure 15 is a transverse vertical section taken on the line XV—XV of Figure 16.
Figure 16:
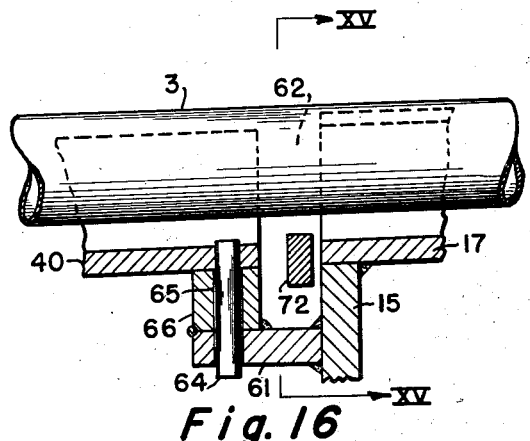
Figure 16 is a longitudinal section taken on the line XVI—XVI of Figure 15 showing the means for connecting the front end of the ramp to the rear end of the carriage.
Figure 17:
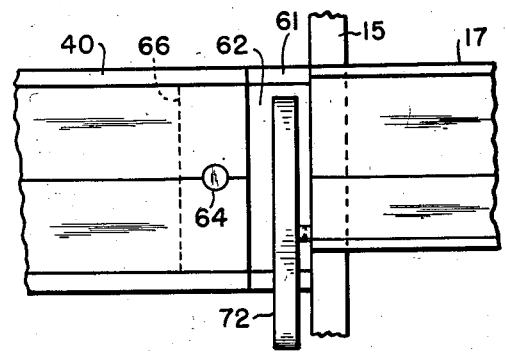
Figure 17 is a plan view, on a smaller scale than that used in Figures 15 and 16, of the structure shown in Figure 16.
Figure 19:
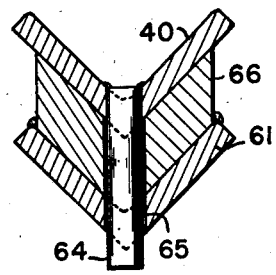
Figure 19 is a section, on an enlarged scale, taken on the line XIX—XIX of Figure 18.
Figure 18:
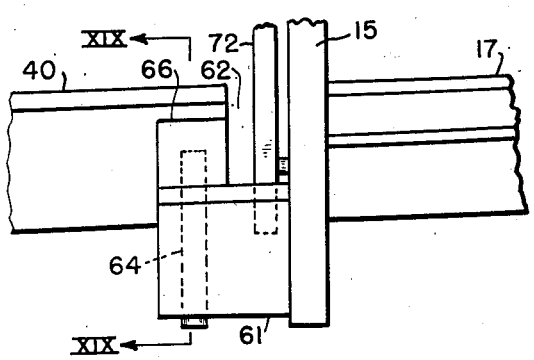
Figure 18 is a side elevation of the structure shown in Figure 17.

Referring more particularly to Figures 6–8, the rear wheels 5 are rigidly connected to a shaft or axle 19 mounted in bearings 20 on the carriage 2 so that as the carriage is moved along the ground by the tractor the wheels 5 and the shaft 19 rotate. A gear 21 which is fixed to the shaft 19 meshes with a gear 22 fixed to a cross shaft 23 mounted on the carriage. A gear 24 is secured to the shaft 23. A crossed chain 25 passes around the gear 24 and around a gear 26 located at the rear of the carriage and mounted on a shaft 27 supported by the carriage. A clutch 28 including a spring 29 connects gear 26 with a gear 30 secured to a shaft 31. An endless sprocket chain 32 passes around the gear 30 at the rear end of the carriage and around a gear 34 mounted at the front end of the carriage, the chain 32 being supported by rollers 35 (Figure 2) mounted on the carriage. Two spaced dogs 38 are secured to the chain 32 as shown in Figures 5 and 6, these dogs contacting the end of a pipe section in the cradle 17 and pushing it from the cradle onto a ramp 40 which has its front end connected to the rear end of the carriage. The ramp is shown in detail in Figures 11, 12 and 13 and the manner in which it is connected to the carriage is illustrated in Figures 15–19. The ramp is V-shaped in cross section and comprises two portions 41 and 42. A supporting plate 43 is secured by a pin 44 to the rear end of part 41. The adjacent end of part 42 rests on the plate 43. The plate 43 has a pin 45 connected by a spring 46 to a pin 47 secured to the part 42, the arrangement being such as to allow the two parts 41 and 42 to flex slightly adjacent the plate 43. The part 42 is provided with rollers 49 mounted on pins 50 connected to the ramp part 42. The ramp part 42 also carries on its inside a raised step 51 which raises the spigot end of a pipe section being pushed down the ramp so as to align it with the bell end of a previously discharged pipe section to facilitate coupling of the pipe sections together.

As shown in Figure 14, each pipe section 3 has a spigot end 54 and a bell end 55. The pipe sections are pushed down the ramp 40 with their spigot ends extending rearwardly and their bell ends extending forwardly of the direction of travel of the carriage. Thus, the spigot end of a pipe section is pushed down the ramp into the bell end of a previously discharged pipe section which is prevented from moving because its opposite end is in contact with the ground or has already been connected with a previously discharged pipe section. The pipe sections are of the type wherein no other force is required to make the joint than the pushing of the spigot end of one pipe section into the bell end of the adjacent pipe section. The bell end of each pipe section carries a U-shaped, resilient sealing ring 56 and a retaining spring 57 which form a tight seal between the pipe sections when fluid under pressure flows through the pipeline in the direction of the arrow 58.

Referring to Figures 15–19, an angle plate 61 extends rearwardly from rack 15 and is spaced below the level of the cradle 17 to provide a space 62 between the adjacent ends of the cradle 17 and the ramp 40. The front end of ramp 40 is provided with a pin 64 which fits into a hole 65 formed in a spacer block 66 inserted between the angle 61 and the ramp 40.

Figure 20:
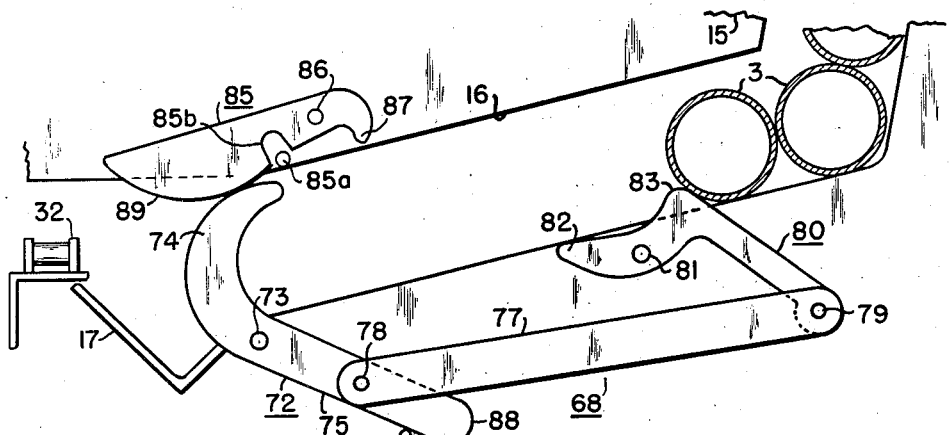
Figure 21:
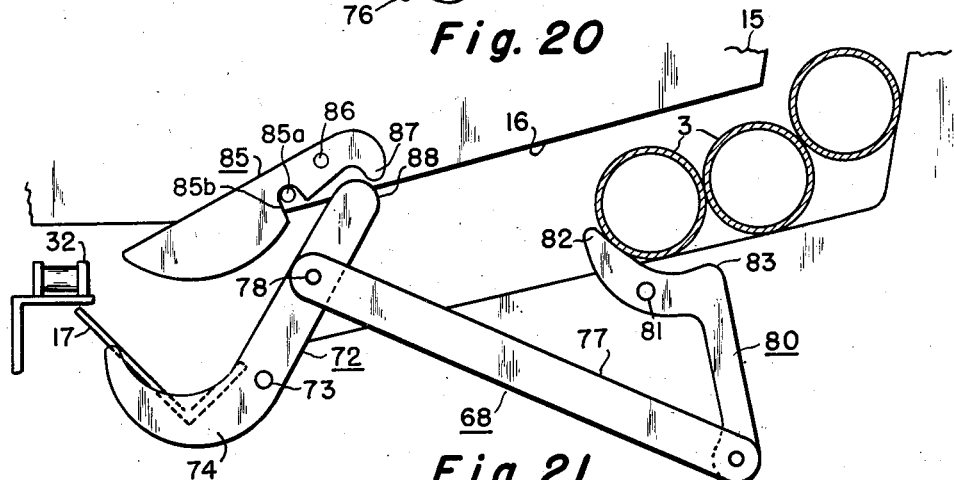
Figure 22:
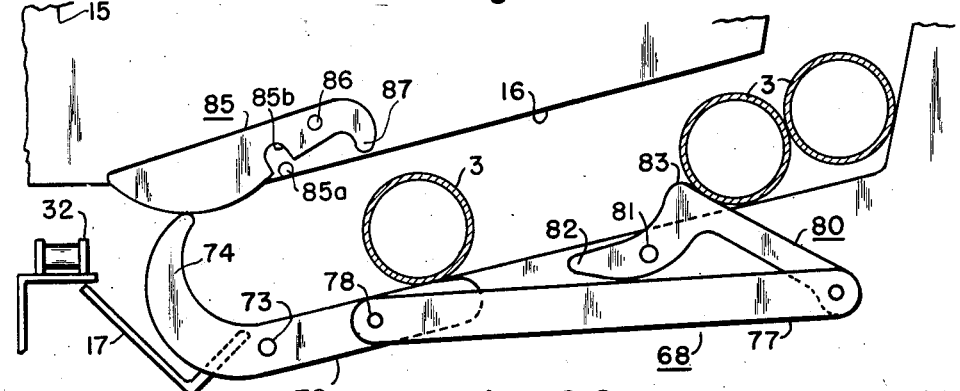

Mechanism for feeding the pipe sections one at a time from the rear rack 15 to the cradle 17 is located in part in the space 62 between the adjacent ends of the cradle 17 and the ramp 40. One set of such mechanism is shown in Figures 20–24, this set being designated by reference numeral 68. A generally similar mechanism designated by reference numeral 69 in Figure 1 is located adjacent the forward end of the carriage 2. A depositing lever 72 is rigidly connected to a rod 73 which extends longitudinally of the carriage, is pivotally mounted in the racks 14 and 15 and is rigidly connected at its other end to a corresponding depositing link 72a located at the front end of the carriage. The lever 72 has a hook portion 74 and a substantially straight arm portion 75. The hook portion 74, when in the position shown in Figure 20, is in alignment with the feeding slot 16 in the rack 15. The hook portion 74 can oscillate about its pivot 73 to the position shown in Figure 21 in which the hook portion is below the cradle 17. A stop pin 76 secured to the rack 15 limits downward movement of the arm portion 75. A link 77 is pivotally connected at 78 to the lever 72 and is pivotally connected at 79 to a stop lever 80 which is pivotally mounted at 81 to the rack 15. The stop lever 80 has a finger portion 82 and a hump 83 extending in generally opposite directions from the pivot 81. A latch 85 is pivoted at 86 to the rack 15 and has a hook portion 87 adapted to cooperate with the end 88 of lever 72 when lever 72 is in the position shown in Figure 23. The latch 85 also has a cam portion 89 for a purpose hereinafter described. A stop pin 85a secured to rack 15 operates in a slot 85b in the latch.

The operation of feeding the pipe sections one at a time from the racks 14 and 15 onto the cradle 17 and then pushing the pipe sections one at a time from the cradle onto and down the ramp 40 is as follows.

The pipe sections 3 roll down the inclined slots 16 in the racks until the first pipe section contacts the hump 83 of stop lever 80 as shown in Figure 20. Pull of gravity on the linkage and the weight of the latch 85 on the depositing lever 72 maintain the parts in the position shown so that hump 83 prevents feeding of a pipe section 3 beyond the hump. When it is desired to start feeding of the pipe sections, the operator raises the pivot 78 upwardly to the position shown in Figure 21, thereby rotating lever 72 counterclockwise about its pivot 73 and rotating stop lever 80 clockwise about its pivot 81 so as to release the hump 83 from the pipe section but to retain the pipe section by the finger 82. The operator then releases the pivot 78 and the parts assume the positions shown in Figure 22 wherein a pipe section 3 is released from finger 82 and rolls down the slot 16 and is received by the hook portion 74 of the receiving lever 72. Hump 83 prevents the next pipe section from rolling down the slot. The weight and force of the pipe section contacting the hook 74 rotates the lever 72 counterclockwise about its pivot 73 and deposits the first pipe section into cradle 17 as shown in Figure 23. Link 77 rotates stop lever 80 clockwise about its pivot 81, lowering the hump 83 but raising finger 82 so as to prevent feeding of another pipe section while the cradle 17 is occupied by the first pipe section. A dog 38 on chain 32 then engages the front end of a pipe section and pushes it rearwardly from the cradle 17 onto and down the ramp 40. The chain 32 is driven at a speed somewhat greater than the forward speed of carriage 2 so that dog 38 pushes the pipe section from the cradle 17 onto the ramp 40 at such speed as to cause the spigot end of the pipe section to enter the bell end of a previous pipe section. During this pushing movement, the latch 85 locks the depositing lever 72 with its hook portion 74 in lowered position so as not to interfere with the movement of the pipe along the cradle. In Figure 24, the bell end 55 of the pipe section is passing over the lever 74, the latch 85 still locking lever 74. When the pipe section has been pushed from the cradle 17 onto the ramp 40, the pull of gravity on the linkage together with the force exerted by a pipe section on the finger portion 82 of stop link 80 causes stop link 80 to rotate counterclockwise and depositing lever 72 to rotate clockwise so that the parts assume the positions shown in Figure 22 with the depositing lever 72 in a position to receive a succeeding pipe section released by finger 82 and deposit it in the cradle.

Where the pipeline is to be used for irrigation purposes, the pipe sections are provided with sprinkler outlets not shown. It is desirable, particularly when the pipeline is used for irrigation purposes, to be able to quickly disassemble the pipe sections and load them onto the carriage. To accomplish this purpose, the carriage is provided with a loading conveyor driven from the road wheels 5. The shaft 23 driven by the road wheels is provided with a worm 92 (Figures 6–8) which meshes with a worm wheel 93 secured to a shaft 94 extending longitudinally of the carriage. A gear 95 is secured to each end of the shaft 94 and a chain 96 passes around each gear 95 and around gears 97 secured to shafts 98. A loading conveyor chain 99 provided with lifting hooks 100 (Figures 9 and 10) passes around a gear 101 secured to the shaft 98 and around a gear 102 secured to a shaft 103. The shafts 98 and 103 are supported in a frame 104. The frame 104 is mounted by means of brackets 105 to the side of the carriage 2. A front guard plate 107 and a rear guard plate 108 are connected to the carriage by brackets 109.

Assuming it is desired to disassemble the sections of a pipeline, load them onto the carriage, move the carriage to a new location and again lay and join the pipe sections together, the operation is as follows.

The carriage is placed adjacent a pipeline and stopped. The operator uncouples a pipe section and places it on the hooks 100 of the loading conveyor chains 99. The carriage is then moved forward one pipe section length. Rotation of the road wheels 5 rotates shaft 23 and this motion is transmitted through worm 92, worm wheel 93, shaft 94 gears 95, chains 96, gears 97, shafts 98, gears 101 and 102 to loading conveyor chains 99 to raise the outside line of the lifting hooks 100. As each pipe section approaches the top of the carriage, it is deposited on the racks 14 and 15. After the carriage is loaded with pipe sections, it is moved to a new location and the pipe sections are continuously laid and joined together in the manner previously described.

The invention is not limited to the preferred embodiment but may be otherwise embodied or practiced within the scope of the following claims.

I claim:

1. A machine for continuously laying and joining pipe sections, comprising a carriage and means for moving it along the ground, racks on the carriage for supporting a plurality of pipe sections arranged longitudinally of the carriage, a cradle supported on the carriage and extending longitudinally thereof, means for feeding the pipe sections one at a time from the racks onto the cradle, a ramp connected at its front end to the rear of the carriage and sloping downwardly and rearwardly with its rear end adjacent the ground, and means for pushing the pipe sections one at a time from the cradle onto the ramp as the carriage moves forwardly and joining them while on the ramp.

2. A machine for continuously laying and joining pipe sections, comprising a carriage and means for moving it along the ground, racks on the carriage for supporting a plurality of pipe sections arranged longitudinally of the carriage, a cradle supported on the carriage and extending longitudinally thereof, means for feeding the pipe sections one at a time from the racks onto the cradle, a ramp connected at its front end to the rear of the carriage and sloping downwardly and rearwardly with its rear end adjacent the ground, and means dependent upon forward movement of the carriage for pushing the pipe sections one at a time from the cradle onto the ramp and joining them while on the ramp.

3. A machine for continuously laying and joining pipe sections, comprising a carriage and means for moving it along the ground, an upwardly extending rack on the carriage adjacent each end thereof, a cradle supported on the carriage and extending longitudinally thereof between said racks, each rack having a downwardly sloping slot for receiving the ends of the pipe sections extending longitudinally of the carriage, the lower ends of said downwardly sloping slots terminating adjacent said cradle, a ramp connected at its front end to the rear of the carriage and sloping downwardly and rearwardly with its rear end adjacent the ground, the front end of said ramp being spaced from the rear end of said cradle, means located in the space between adjacent ends of said cradle and ramp for feeding the pipe sections one at a time from said racks onto said cradle, and means for pushing the pipe sections one at a time from the cradle onto the ramp as the carriage moves forwardly and joining them while on the ramp.

4. A machine according to claim 3, wherein the means for feeding the pipe sections one at a time from said racks onto said cradle comprises a pivotally mounted depositing lever having a portion adapted to oscillate from a position in line with the lower end of the slot in said rack to a position below said cradle to deposit a pipe section in said cradle, a pivotally mounted stop lever spaced from said depositing lever and adapted upon oscillation to feed the pipe sections one at a time along said slot to said depositing lever, and a link pivotally connected to said depositing lever and said stop lever for actuating the same in unison.

5. A machine according to claim 4, wherein the portion of the depositing lever which is adapted to oscillate between the stated positions is hook shaped and the depositing lever has a substantially straight arm portion, the stop lever has a finger portion and a hump extending in generally opposite directions from the pivot of said stop lever, the stop lever has a substantially straight arm portion, and said link is pivotally connected to the substantially straight arm portions of said depositing lever and said stop lever.

6. A machine according to claim 3, wherein the means for feeding the pipe sections one at a time from said racks onto said cradle comprises a pivotally mounted depositing lever having a portion adapted to oscillate from a position in line with the lower end of the slot in said rack to a position below said rack to deposit a pipe section in said cradle, a pivotally mounted stop lever spaced from said depositing lever and adapted upon oscillation to feed the pipe sections one at a time along said slot to said depositing lever, a link pivotally connected to said depositing lever and said stop lever for actuating the same in unison, and a pivotally mounted latch having a portion adapted to lock said depositing lever in position below said cradle and to prevent said stop lever from feeding another pipe section to said cradle while said cradle is occupied by a pipe section.

7. A machine for continuously laying and joining pipe sections, comprising a carriage supported on road wheels, means for moving the carriage long the ground, racks on the carriage for supporting a plurality of pipe sections arranged longitudinally of the carriage, a cradle supported on the carriage and extending longitudinally thereof, means for feeding the pipe sections one at a time from the racks onto the cradle, a ramp connected at its front end to the rear of the carriage and sloping downwardly and rearwardly with its rear end adjacent the ground, a continuous chain located adjacent said cradle and extending longitudinally of said carriage, means connecting said road wheels and chain for driving said chain upon rotation of said road wheels, and spaced dogs fixed to said chain and arranged to contact a pipe section in said cradle and push it from the cradle onto said ramp as said carriage moves forwardly.

8. A machine according to claim 7, wherein said dogs are spaced apart a distance greater than the length of a pipe section in order to allow another pipe section to be deposited in said cradle without interference from said dogs after a previous pipe section has been pushed from the cradle.

9. A machine according to claim 7, comprising an endless loading conveyor supported by the carriage on one side adjacent each end thereof, each conveyor having hooks adapted to receive the ends of pipe sections and to lift the pipe sections and deposit them on said racks, and means for driving said loading conveyors from said road wheels.

10. A machine for continuously laying and joining pipe sections, comprising a carriage and means for moving it along the ground, racks on the carriage for supporting a plurality of pipe sections arranged longitudinally of the carriage, a cradle supported on the carriage and extending longitudinally thereof, means for feeding the pipe sections one at a time from the racks onto the cradle, a ramp connected at its front end to the rear of the carriage and sloping downwardly and rearwardly with its rear end adjacent the ground, means for pushing the pipe sections one at a time from the cradle onto the ramp as the carriage moves forwardly and joining them while on the ramp, a substantially vertically extending, loading conveyor located on one side of the carriage adjacent each end thereof and adapted to receive pipe sections placed thereon and raise them and deposit them on said racks, said carriage having road wheels, and means connecting said road wheels and said loading conveyors for driving said loading conveyors from said road wheels.

(Other references on following page)

References Cited in the file of this patent

UNITED STATES PATENTS

| | | |
|---|---|---|
| 1,088,980 | Goble | Mar. 3, 1914 |
| 1,152,326 | Lewis | Aug. 31, 1915 |
| 2,538,365 | Jones | Jan. 16, 1951 |
| 2,603,365 | Moores | July 15, 1952 |
| 2,704,162 | Johnson | Mar. 15, 1955 |

FOREIGN PATENTS

| | | |
|---|---|---|
| 862,220 | France | Nov. 30, 1940 |